US011375166B2

(12) United States Patent
Paul et al.

(10) Patent No.: US 11,375,166 B2
(45) Date of Patent: Jun. 28, 2022

(54) SELECTIVE COLORIZATION OF THERMAL IMAGING

(71) Applicant: Microsoft Technology Licensing, LLC, Redmond, WA (US)

(72) Inventors: Erick Joseph Paul, Bothell, WA (US); Sean Andrew McGlynn, Seattle, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/027,485

(22) Filed: Sep. 21, 2020

(65) Prior Publication Data

US 2022/0094896 A1 Mar. 24, 2022

(51) Int. Cl.
| | |
|---|---|
| *G06T 5/50* | (2006.01) |
| *H04N 9/64* | (2006.01) |
| *H04N 9/77* | (2006.01) |
| *G06T 5/00* | (2006.01) |
| *G06K 9/62* | (2022.01) |
| *H04N 5/232* | (2006.01) |
| *G06T 7/33* | (2017.01) |
| *H04N 5/247* | (2006.01) |

(52) U.S. Cl.
CPC ........... *H04N 9/646* (2013.01); *G06K 9/6267* (2013.01); *G06T 5/008* (2013.01); *G06T 5/50* (2013.01); *G06T 7/33* (2017.01); *H04N 5/23229* (2013.01); *H04N 5/247* (2013.01); *H04N 9/77* (2013.01); *G06T 2207/10048* (2013.01); *G06T 2207/20092* (2013.01); *G06T 2207/20221* (2013.01)

(58) Field of Classification Search
USPC ........................................................ 348/164
See application file for complete search history.

(56) References Cited

U.S. PATENT DOCUMENTS

| | | | |
|---|---|---|---|
| 7,622,716 B2 | 11/2009 | King | |
| 8,611,586 B1 * | 12/2013 | Brodeur | G06K 9/3241 |
| | | | 382/100 |
| 8,836,793 B1 | 9/2014 | Kriesel et al. | |
| 9,165,210 B1 | 10/2015 | Srinivasan et al. | |

(Continued)

FOREIGN PATENT DOCUMENTS

| | | |
|---|---|---|
| CN | 104992418 A | 10/2015 |
| WO | 2015157058 A1 | 10/2015 |
| WO | WO-2015157058 A1 * | 10/2015 ........... G06K 9/3241 |

OTHER PUBLICATIONS

"Microsoft's Cheap AR HMD Uses Passthrough VR", Retrieved from: https://vrroom.buzz/vr-news/tech/microsofts-cheap-ar-hmd-uses-passthrough-vr, Oct. 31, 2018, 6 Pages.

(Continued)

*Primary Examiner* — Behrooz M Senfi
(74) *Attorney, Agent, or Firm* — Alleman Hall Creasman & Tuttle LLP

(57) ABSTRACT

An example computing system comprises a processor and a storage device holding instructions executable by the processor to receive a thermal image acquired via a thermal imaging system, each pixel of the thermal image comprising an intensity level, and generate a histogram via binning pixels by intensity level. The instructions are further executable to, based at least on the histogram, determine a subset of pixels to colorize, colorize the subset of pixels to produce a selectively colorized image, and output the selectively colorized image.

20 Claims, 7 Drawing Sheets

(56) References Cited

U.S. PATENT DOCUMENTS

| | | | |
|---|---|---|---|
| 9,451,225 B2 | 9/2016 | Feda | |
| 10,152,811 B2* | 12/2018 | Johnson | G06T 11/60 |
| 2006/0221180 A1* | 10/2006 | Ostromek | G06T 11/001 |
| | | | 348/53 |
| 2014/0218520 A1* | 8/2014 | Teich | H04N 5/332 |
| | | | 348/165 |
| 2015/0254985 A1* | 9/2015 | Fisher | G06K 9/00362 |
| | | | 348/148 |
| 2015/0269742 A1* | 9/2015 | Bergstrom | G06T 5/50 |
| | | | 348/164 |
| 2016/0086379 A1* | 3/2016 | Sadi | G02B 27/0093 |
| | | | 345/633 |
| 2018/0300906 A1* | 10/2018 | Lu | G06T 5/50 |
| 2019/0014300 A1 | 1/2019 | Henry | |
| 2019/0130535 A1* | 5/2019 | Williams | G06T 5/002 |
| 2020/0029059 A1* | 1/2020 | Chahine | H04N 9/77 |

OTHER PUBLICATIONS

Koji, et al., "ColorMotion: Automatic video colorization", In Thesis of Polytechnic University of Sao Paulo, Dec. 2018, 47 Pages.

Toet, et al., "Portable Real-Time Color Night Vision", In Proceedings of SPIE—The International Society for Optical Engineering, Mar. 2008, 12 Pages.

Waxman, et al., "Solid-State Color Night Vision: Fusion of Low-Light Visible and Thermal Infrared Imagery", In Lincoln Laboratory Journal, vol. 11, Issue 1, Jan. 1999, pp. 41-60.

Faridul, et al., "A Survey of Color Mapping and its Applications", In Proceedings of 35th Annual Conference of the European Association for Computer Graphics, vol. 3, Issue 2, Apr. 7, 2014, pp. 43-67.

"International Search Report and Written Opinion Issued in PCT Application No. PCT/US2021/036065", dated Oct. 1, 2021, 11 Pages.

Qadir, et al., "Enhancing Thermal Video Using a Public Database of Images", In Proceeding of Multisensor, Multisource Information Fusion: Architectures, Algorithms, and Applications, vol. 9121, International Society for Optics and Photonics., May 22, 2014, 8 Pages.

Zheng, Yufeng, "An Overview of Night Vision Colorization Techniques Using Multispectral Images: from Color Fusion to Color Mapping", In Proceeding of International Conference on Audio, Language and Image Processing, Jul. 16, 2012, pp. 134-143.

* cited by examiner

SELECTIVE COLORIZATION OF THERMAL IMAGING

BACKGROUND

Thermal imaging cameras are configured to sense an infrared radiation intensity at each pixel of an image sensor. The resulting intensities may be processed to convert the intensities to displayable grayscale or color values.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to selective colorization of thermal images and low-light images. In an example, a computing system comprises a processor and a storage device holding instructions executable by the processor to receive a thermal image acquired via a thermal imaging system, each pixel of the thermal image comprising an intensity level. The instructions are further executable to generate a histogram via binning pixels by intensity level—based at least on the histogram, determine a subset of pixels to colorize, colorize the subset of pixels to produce a selectively colorized image, and output the selectively colorized image.

In another example, a computing system comprises a processor and a storage device holding instructions executable by the processor to receive a thermal image of a scene, receive a low-light image of the scene acquired via a low-light imaging system, and computationally combine the thermal image of the scene and the low-light image of the scene. The instructions are further executable to, based at least on computationally combining the thermal image of the scene and the low-light image of the scene, produce a selectively colorized image, and output the selectively colorized image.

DETAILED DESCRIPTION

Figure 1:
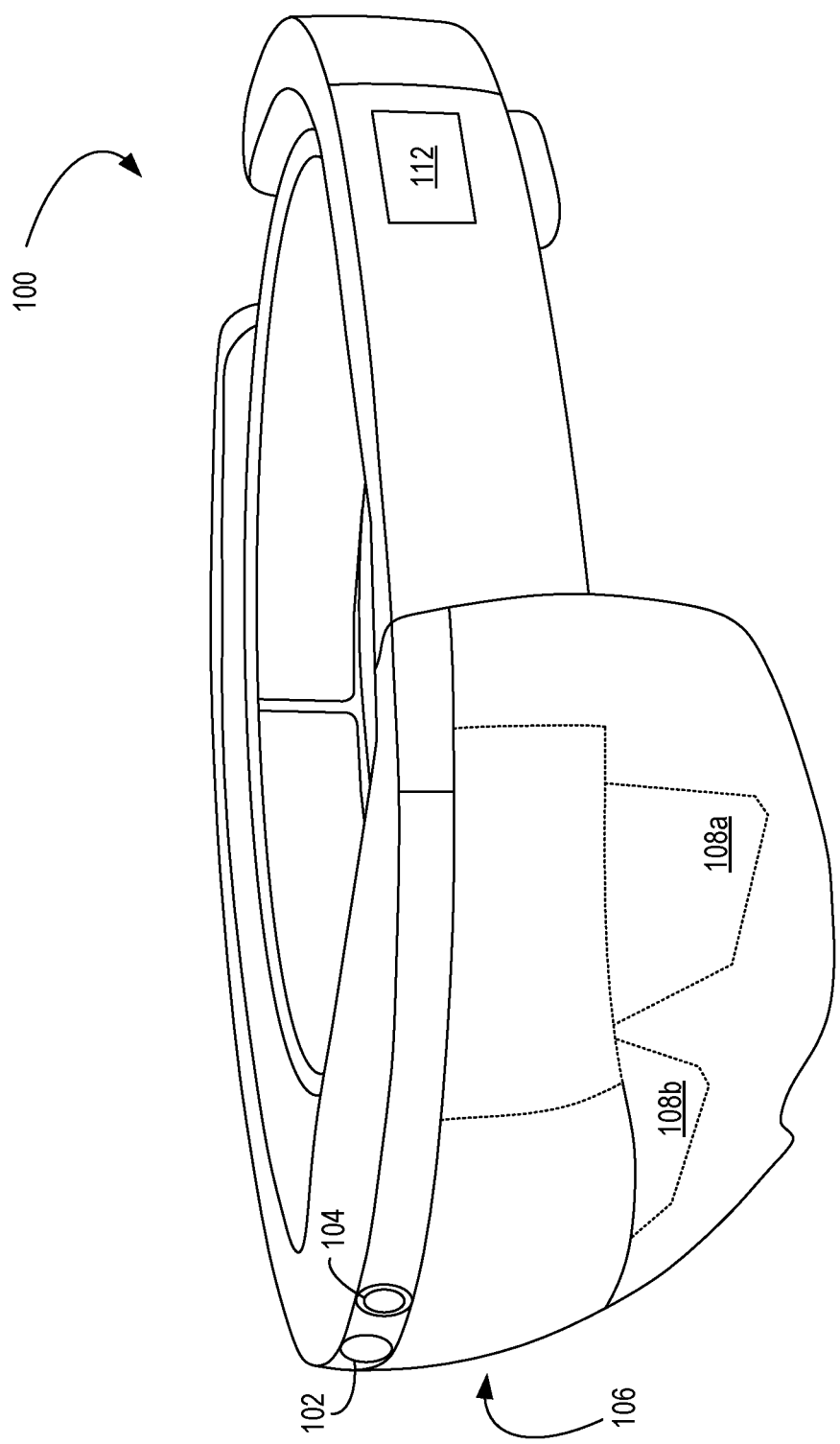
FIG. 1 is an example embodiment of a wearable heads-up display device.

Various imaging techniques exist for imaging a scene in low-light conditions. Some techniques employ an infrared camera to capture infrared radiation at each pixel of an image sensor. The resulting intensity data may be processed to produce a visual representation of the thermal image. Other techniques uses photomultipliers or other amplification devices to amplify signal arising from detected photons (e.g., "night-vision"). Such low-light imaging systems may allow a user to detect faint illumination from an object, or view a scene that is only illuminated by starlight, as examples.

Low-light and/or thermal imaging systems may capture and display images in either grayscale (i.e., single channel) or in multicolor. Grayscale thermal images display a single intensity level for each pixel, where an intensity between black and white represents an intensity of a signal received at that pixel. Colorizing a thermal channel or low-light channel may comprise applying a color map (e.g. a mapping of colors to corresponding ranges of intensities) to intensity image data. As a result, full-color images may comprise a color palette spanning a range of intensities, e.g., lower intensity pixels may be displayed as blue while higher intensity pixels may appear red.

However, such grayscale and colorized images may pose difficulties for object identification. For example, traditional grayscale/colorization techniques may fail to highlight objects in a meaningful way. A full-color image may appear cluttered or sparse, with no obvious objects of interest. As a result, a viewer may take a relatively long time to examine the entire image before identifying objects of interest. Further, objects of interest in a low-contrast scene may have a similar color (or similar grayscale) as other objects, making it difficult for a user to differentiate between objects of interest and background. For example, in a relatively hot room, a person may be colorized in a similar hue to other objects in the room. Likewise, a standard grayscale image may display a cold object of interest in dark gray or black pixels, making it difficult for a user to identify the object. Furthermore, when combining a low-light image with a thermal image, fine detail information may be lost in the process.

In some instances, a user may desire to view differences between low-light imagery and thermal imagery, as such differences may reveal information that is difficult to see in either image alone. For example, textures (e.g. paint) on an object may appear only slightly brighter or darker in the low-light image, and may be indistinguishable from surrounding textures in the thermal image.

Accordingly, examples are disclosed for selective colorization of images based at least in part on thermal imagery. A selectively colorized image may present information to a viewer in a more meaningful manner by colorizing potential objects of interest while leaving the remainder of the image unemphasized. In one example, an image is selectively colorized by creating a histogram of the pixels within a thermal image and then colorizing a subset of pixels based on one or more threshold pixel intensity levels applied to the histogram. As a result, relatively hotter and/or colder objects in a scene may be selectively colorized, or any other suitable pixel intensity level range may be colorized. The resulting selectively colorized image may appear less cluttered, and emphasize potential objects of interest.

In other examples, portions of an image may be selectively colorized based upon a computational combination of a thermal image and a low-light image (e.g. a difference, a sum, a product, a quotient, a Boolean comparison, or other suitable combination). For example, an edge-detection algorithm may be used to detect edges in a thermal image of a scene and in a low-light image of the scene. The edges located in the images can be compared (e.g. by computing a difference between the two images, a sum of the two images, etc.) to identify features such as differences in textures on a surface, and may help to highlight fine details and other information for the user.

Prior to describing these examples in detail, an example thermal imaging display system in the form of a head-mounted display (HMD) device 100 is described with reference to FIG. 1. HMD device 100 comprises a thermal imaging camera 102 and low-light imaging camera 104. HMD device 100 further comprises processing circuitry 112 configured to process images from cameras 102, 104, and to display processed images on near-eye displays 108a, 108b. HMD device 100 may capture real-time video from thermal imaging camera 102 and/or low-light imaging camera 104 output real-time video to near-eye displays 108a, 108b. Visor 106 and near-eye displays 108a, 108b may be at least partially transparent to allow a user to view real-world objects. For example, each near-eye display 108a, 108b may comprise a transparent optical combiner (e.g. a waveguide) that delivers projected imagery to the user while allowing the user to view a real-world background through the combiner. In this manner, image content displayed via near-eye displays 108a, 108b may appear to be mixed with real-world scenery. Other types of thermal imaging devices are also envisioned, e.g. handheld devices or non-wearable devices, as well as other computing devices that process image data received from thermal imaging devices (e.g. personal computers, tablet computers, laptop computers, smart phones, and server computers). In some examples, the display and/or processing circuitry may be remote to the thermal camera. Further, in some examples, low-light imaging camera 104 may be omitted.

Figure 2:
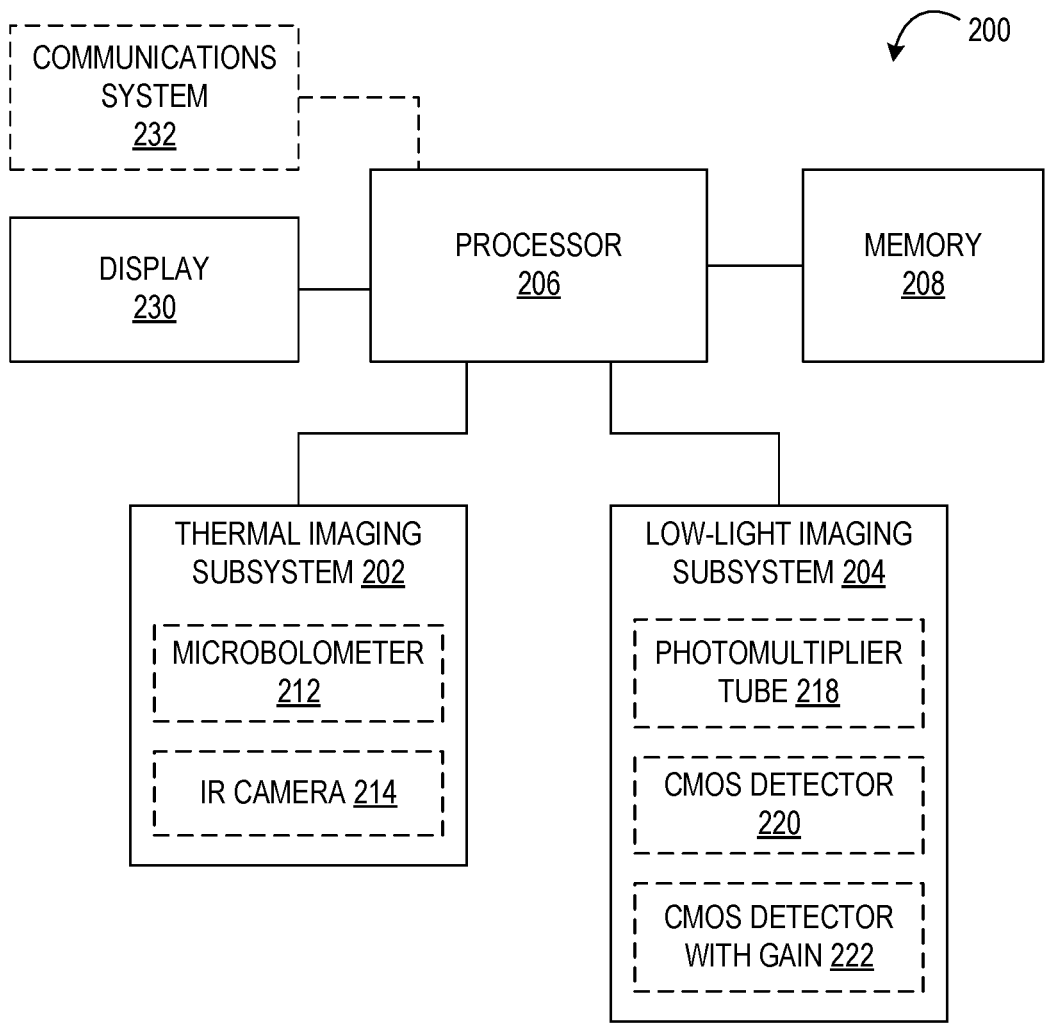
FIG. 2 schematically shows an example computing system including a thermal imaging system and low-light imaging system.

FIG. 2 shows a block diagram of an example computing system 200 comprising a thermal imaging subsystem 202 and a display 230. Computing system 200 may be implemented as display system 100, for example. Computing system 200 further comprises a low-light imaging system 204, but other examples may omit the low-light imaging subsystem. Computing system 200 further comprises a processor 206 configured to control thermal imaging system 202 and low-light imaging subsystem 204. Processor 206 may receive image data, process the image data to produce colorized image data as described in more detail below, and output the resulting colorized images (still and/or video) to display 230. Memory 208 may store data and instructions executable by processor 206 to perform the processes described herein. In some examples, processor 206 may communicate with an external computing system (e.g. a cloud-based computing system) via a communications system 232, such that logic is distributed between processor 206 and the remote computing system.

Thermal imaging subsystem 202 may comprise any suitable thermal imaging hardware, such as a microbolometer 212, IR camera 214, and/or other suitable thermal imaging device configured to sense infrared light. Similarly, low-light imaging subsystem 204 may comprise any suitable low-light imaging hardware, such as a photomultiplier 218, a CMOS detector 220, and/or a CMOS detector with gain 222.

In some examples, thermal imaging computing system 200 may be configured as a wearable computing device, such as HMD device 100. In other examples, computing system 200 may take other suitable forms, such as a handheld device, a wall-mounted camera system, a vehicle-mounted camera system, or any suitable computing device that receives image data from a separate thermal imaging device (e.g. a laptop computer, a desktop computer, or a server computer). In some examples, various components illustrated in FIG. 2 may be omitted, such as a display.

Figure 3:
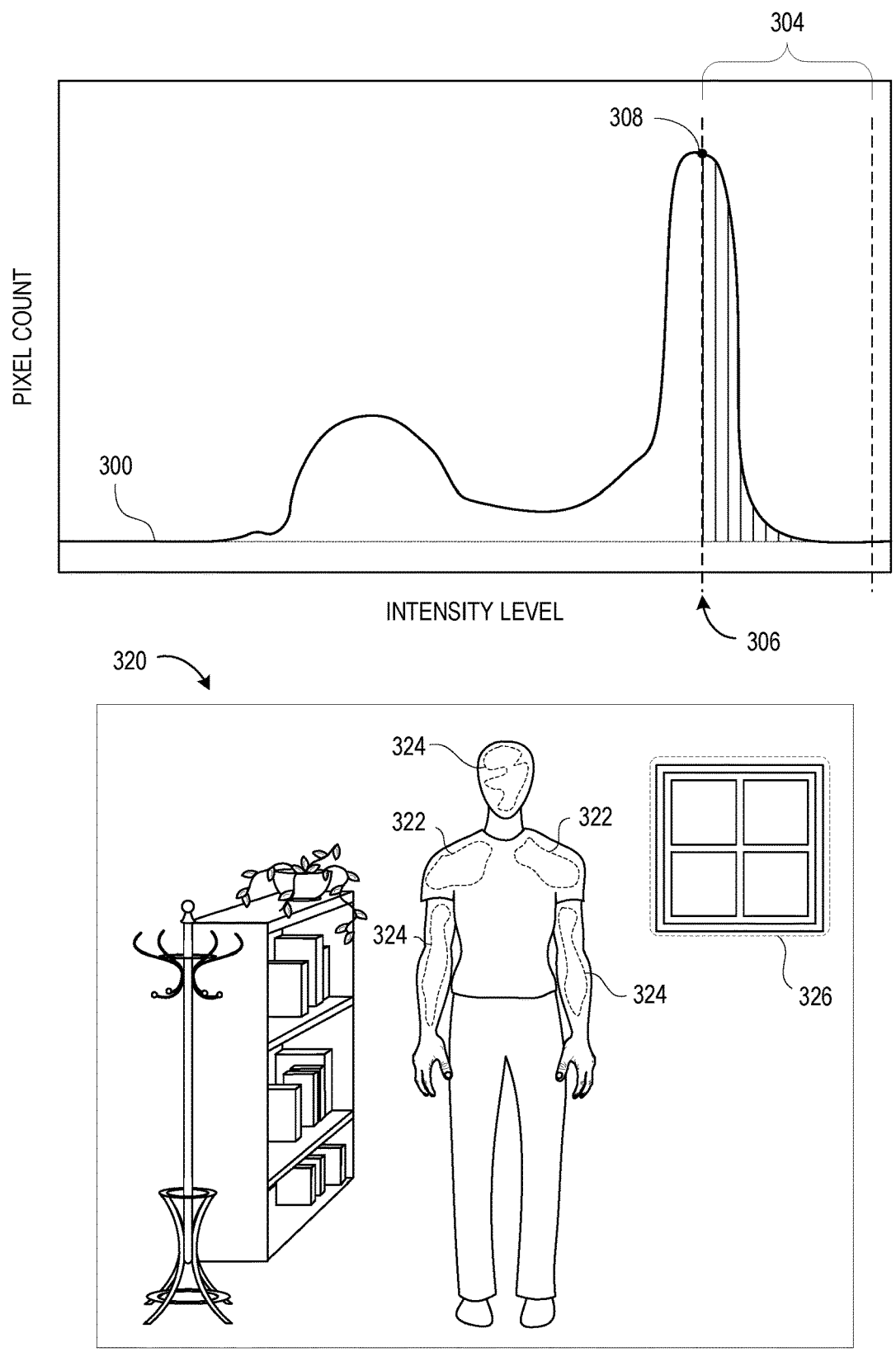
FIG. 3 shows an example histogram and a corresponding thermal image that has been selectively colorized.

As mentioned above, computing system 200 may be configured to selectively colorize an image, for example to facilitate the location of potential objects of interest. In some examples, computing system 200 may perform selective colorization of an image based at least on applying thresholding to a histogram of the image. FIG. 3 shows an example histogram 300 for an image of a scene imaged by thermal imaging subsystem 202. Here, each bin of histogram 300 corresponds to a range of intensities, and the pixel count for each bin represents how many pixels in the bin fall within the intensity range. As the intensity level of a pixel may represent the apparent temperature of an object in the scene corresponding to the pixel position, intensity levels may thus be correlated with temperature. In FIG. 3, the pixel "temperature" increases with pixel intensity level from left to right on histogram 300. In examples where the objects of interest are the hottest or coldest objects in a scene, a subset of pixels to be colorized may be chosen by applying an appropriate threshold or thresholds to the histogram.

FIG. 3 illustrates a threshold applied to a histogram which allows for relatively "hotter" pixels to be selectively colorized. In this example, a subset of pixels 304 to be colorized is determined based on the pixels being above threshold intensity level 306. Pixels not within subset 304 (i.e., pixels in bins with lower intensity levels than threshold intensity level 306) may be left un-colorized. In a thermal image, the pixel intensity corresponds to temperature, such that brighter pixels represent relatively hotter objects while darker pixels represent relatively colder objects. As such, the subset of pixels 304 in FIG. 3 that are to be colorized correspond to relatively "hotter" pixels of the image. In other examples, the threshold intensity level may specify an upper bound and the subset of pixels may comprise relatively "colder" pixels in the image.

A threshold to apply to a histogram may be determined in any suitable manner. In some examples, a threshold intensity level may be chosen such that a certain percentage of pixels are colorized (e.g., the brightest 5% or 10% of pixels). Additionally or alternatively, threshold intensity level 306 may be chosen based on pixel count, e.g., a global or local maximum of histogram 300. For example, a global maximum 308 may be identified in the histogram and used to set threshold intensity level 306. In some examples, a threshold condition can be hard-coded, while in other examples the threshold condition can be varied (e.g. automatically based upon characteristics of the image, or by user selection). In examples where a sequence of images are processed (e.g., a video feed), the threshold condition may be automatically adjusted for each image.

In the depicted example, threshold intensity level 306 is a lower-bound threshold condition, and the subset of pixels 304 corresponds to pixels with intensity levels equal to or greater than threshold intensity level 304. In other examples, an upper-bound threshold condition, or a combination of two or more threshold conditions, may be used. For example, two or more threshold intensity levels may be selected to determine two different subsets of pixels to be colorized. A first subset of pixels may comprise pixels having an intensity level meeting a first threshold condition. Likewise, a second subset of pixels to be colorized may comprise pixels having an intensity level that meets a second threshold condition. As a more specific example, the first subset may comprise pixels corresponding to a "coldest" set of objects in the scene, while the second subset comprised pixels corresponding to a "hottest" set of objects in the scene.

Selectively colorized image 320 represents an example image that has been selectively colorized based on histogram 300. Regions 322 and 324 may corresponds to pixels within the subset of pixels 304. Pixels within regions 322, 324 are colorized while pixels outside those regions are not colorized. Any suitable colorization scheme may be used. For example, a single hue or a combination of different hues (e.g., color map) may be used. Thus, the applied hue for each pixel may be the same, or may be based on the intensity level of the pixel. Furthermore, the pixel saturation and/or value may be associated with the intensity level. As such, pixels in colorized region 322 may comprise a different hue, saturation, and/or value compared to pixels in region 324. Any suitable color mapping or color palette technique may be used.

In examples in which two or more thresholds are applied to define two or more subsets of pixels, the two or more subsets of pixels may be colorized using the same or different hues, the same or different color maps, or any other suitable colorization scheme. For example, pixels in region 326 may be colorized by applying a first color map while pixels in regions 322, 324 are colorized by applying a second color map. As such, the colorization technique for colorizing a pixel may depend on the threshold condition met by the pixel.

In examples in which both thermal and low-light images are acquired, after colorizing the thermal image, the selectively colorized image may be fused with the low-light image to create a fused image. A fused image may comprise a renormalized composite of the selectively colorized thermal image and the low-light image. As a more specific example, if $I_T$ represents pixel intensities in the thermal channel and $I_{LL}$ represents pixel intensities in the low-light channel, the fused image pixel intensities may be $I_F=n(I_T+I_{LL})$, where n is a normalization factor. Any suitable method may be used to fuse the images. Examples include, but are not limited to, $I_F=n(I_T \times I_{LL})$, $I_F=n(I_T+I_F=n(\log I_T+I_{LL})$, $I_F=n(I_T \log I_T+I_{LL} \log I_{LL})$, etc. Fusing the images may result in adjustments to the hue, saturation, or value levels of the pixels in the selectively colorized regions. In other examples, instead of or in addition to selectively colorizing the thermal image before fusing the thermal image with the low light image, a histogram may be produced from the fused image, and then the fused image may be selectively colorized based at least on the histogram.

Some scenes that are thermally imaged may comprise a temperature range that can exceed a dynamic range of a thermal imaging device. However, dynamic range compression algorithms may unintentionally lower contrast and/or cause noticeable loss of detail. In other scenes, multiple objects that are close in temperature can result in a narrow dynamic range, and therefore relatively low image contrast. Thus, in some examples, various contrast enhancement algorithms may be employed to increase the dynamic range of a thermal image, preserve detail, sharpen an image, or otherwise enhance contrast. In some examples, a local area contrast enhancement (LACE) algorithm can be applied to the thermal image. In some examples, a histogram equalization algorithm can be used as a LACE algorithm. LACE techniques may be used to enhance the appearance of light-dark transitions, which may enable a user to more easily see detail and texture in an image. LACE algorithms may enhance local contrast while preserving global contrast levels. Such algorithms may help to increase the visibility of small-scale edges and sharpen an image.

The use of LACE algorithm on a thermal image modifies the intensity levels of the pixels. Thus, in some examples, a LACE algorithm is applied prior to creating a histogram via binning the pixels. After applying the LACE algorithm, in some examples, the resultant histogram may appear flatter, and the relationship between cumulative pixel count and intensity level may be more linear than in the image prior to applying the LACE algorithm. As such, setting a pixel intensity threshold at, e.g., 5% of the maximum intensity level may select approximately 5% of pixels for colorization.

Other image processing techniques may also be used, including image compression, data compression, gamma correction, smoothing, low/high pass filtering, and combinations of two or more techniques. Image processing may be performed on the thermal image, the low-light image, or both images. A thermal image may be processed prior to and/or after creating the histogram.

Further, in some examples, objects in the scene may be identified by applying a classifier function to an image. Such a classifier function may be applied to one or more of a thermal image, a low-light image, a fused image, and/or a selectively colorized image of a scene. In some examples, the classifier function may be applied before creating the histogram, while in other examples, the classifier may be applied after creating and thresholding the histogram. In any of such examples, selective colorization of the image may be applied based upon the output from the classifier function. For example, an object identified via a classifier function may be colorized if at least some of the pixels of the object are determined to be colorized. As another example, an object identified via a classifier may be selectively colorized based upon having been classified, without consideration of the histogram. In other examples, the identified object is colorized if a sufficient fraction of pixels of the object meet a threshold condition and are to be colorized. Further, in some examples, a classifier function may be applied after selective colorization. In such examples, the output from the classifier may be used to add additional colorization to the image, such as to separately highlight objects that may not meet a threshold intensity, but that are still of interest due to the classification determined. Any suitable classifier function may be used. Examples include machine learning functions such as one or more neural networks (e.g. a convolutional neural network).

Figure 4:
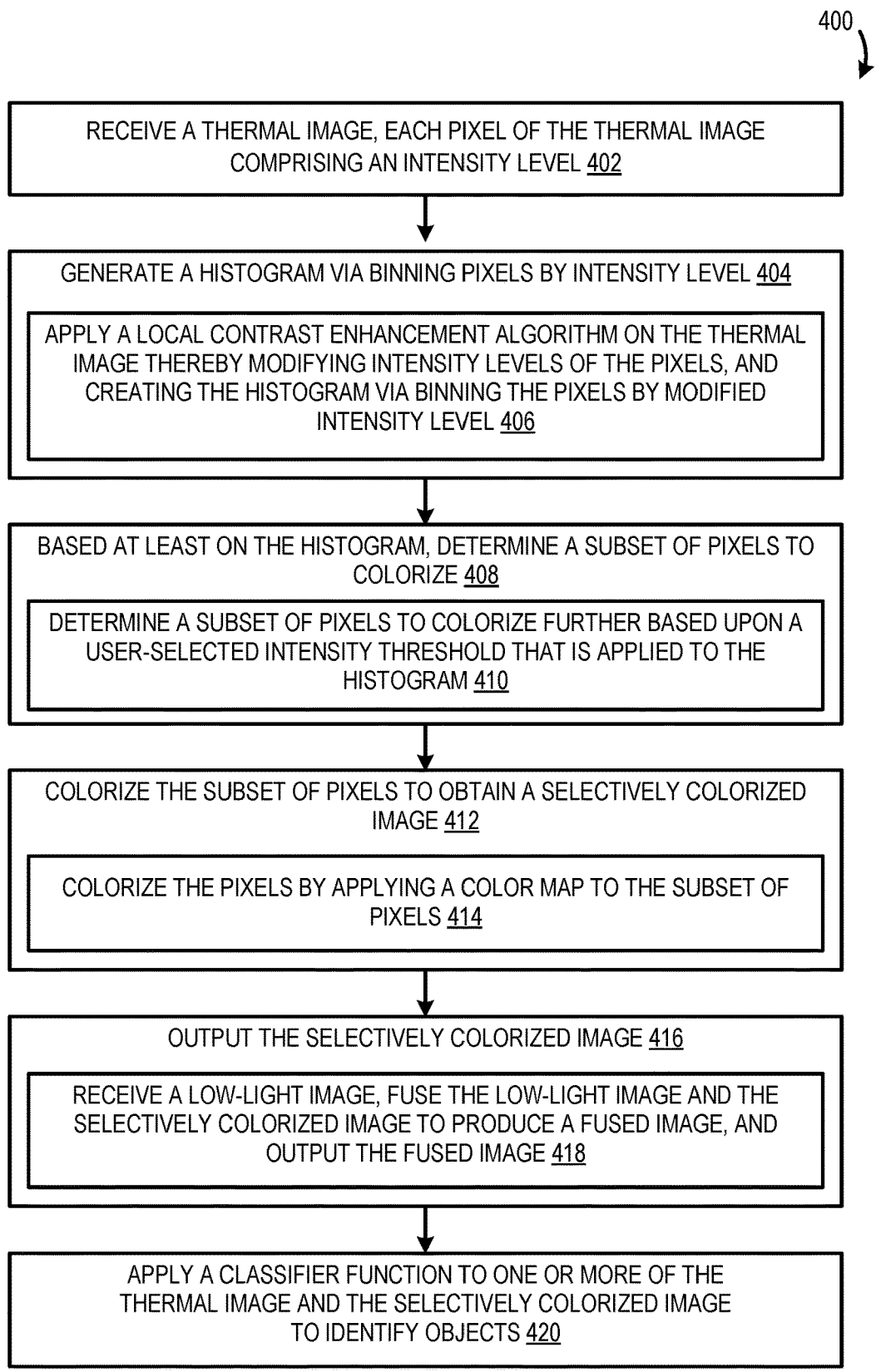
FIG. 4 shows a flow diagram depicting an example method for selectively colorizing a thermal image.

FIG. 4 shows a flow diagram illustrating an example method 400 for selectively colorizing an image based at least on a histogram of pixels in a thermal image. At 402, method 400 comprises receiving a thermal image, each pixel of the thermal image comprising an intensity level. The thermal image may be received from thermal imaging subsystem 202, for example. At 404, method 400 comprises generating a histogram via binning pixels by intensity level. In some examples, at 406, the method comprises applying a local contrast enhancement algorithm on the thermal image thereby modifying intensity levels of the pixels, and creating the histogram via binning the pixels by modified intensity level.

Continuing at 408, method 400 comprises, based at least on the histogram, determining a subset of pixels to colorize. A threshold condition may be used to determine the subset of pixels, whereby any pixel meeting the threshold condition is colorized. A single threshold condition or a plurality of threshold conditions may be used. In some examples, at 410, determining a subset of pixels to colorize is further based upon a user-selected intensity threshold that is applied to the histogram.

At 412, method 400 comprises colorizing the subset of pixels to obtain a selectively colorized image. In some examples, at 414, the method comprises colorizing the pixels by applying a color map to the subset of pixels. In other examples, a single hue can be applied. In yet other examples, a grayscale enhancement can be applied. In still other examples, different colorization techniques (e.g. different color maps) may be applied for different threshold conditions.

At 416, method 400 comprises outputting the selectively colorized image. In some examples, the method comprises outputting the selectively colorized image to a display on a same device, such as display subsystem 230. In other examples, the method may comprise outputting the selectively colorized image to a remote computing system via communications system 232. In some examples, at 418, outputting the selectively colorized image comprises receiving a low-light image, fusing the low-light image and the selectively colorized image to produce a fused image, and outputting the fused image. The low-light image may be received via low-light imaging system 204.

In some examples, the method may further comprise, at 420, applying a classifier function to one or more of the thermal image and the selectively colorized image to identify objects of interest. As described above, the classifier function may be applied either before or after selective colorization of the thermal image in various examples. Further, in some examples, classified objects in an image may be selectively colorized independent of whether the objects would be classified based upon pixels corresponding to the object meeting the threshold condition applied to the histogram.

As discussed above, in some examples, selective colorization may be based upon a computational combination of a thermal image and a low light image. The computational combination may correspond to a difference, a sum, a product, a quotient, a Boolean comparison, or any other suitable computational combination. In such examples, the selective colorization of an image may be based upon differences, unions, and/or intersections between features in the images as identified via the computational combination of the thermal image and the low-light image. As one example, an edge an edge-finding algorithm is applied to an image to locate edges in each of the low-light and thermal images, and selective colorization is performed based on a comparison of edges in the two images. In a more specific example, based on the difference between the edges in the two images, an image is selectively colorized to highlight the edges that appear in one image and not the other image. Selective colorization can also be applied based upon a union or intersection of edges in the images, as examples. Any suitable edge-finding algorithm may be used, including but not limited to a Sobel filter.

Figure 5:
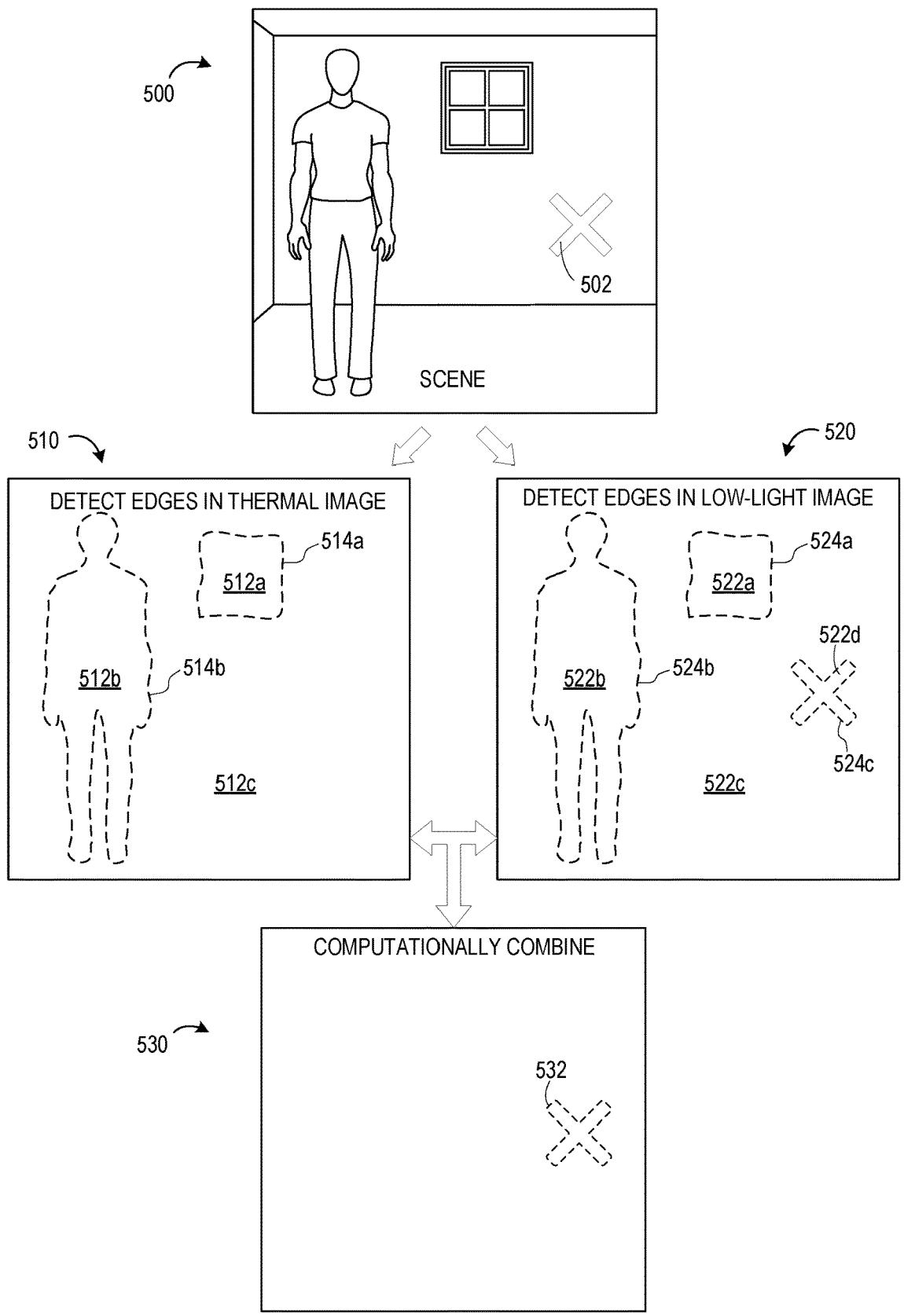
FIG. 5 schematically shows example images depicting the use of edge detection to enhance low-light and thermal images.

FIG. 5 shows schematic representations of example thermal and low-light images, and illustrates identifying features for selective colorization based on the differences between edges in the two images. Example scene 500 is an arbitrary scene comprising objects, a person, and a texture 502 in the form of an "X" symbol painted on a wall. Image 510 is an example filtered thermal image representing scene 500 produced by applying an edge-finding algorithm to a thermal image. Image 510 comprises regions 512a, 512b, 512c each corresponding to different temperatures (i.e., a window, a person, and a background, respectively). In the example shown, an edge-finding algorithm has been applied to image 510 to locate edges 514a, 514b that correspond to boundaries between the different temperature regions.

Image 520 is an example filtered low-light image representing scene 500. Image 520 comprises regions 522a, 522b, 522c, and 522d each corresponding to different intensities (i.e., the window, the person, the background, and the texture 502, respectively). In the example shown, an edge-finding algorithm has also been applied to low-light image 520 to locate edges 524a, 524b, and 524c.

Image 510 and image 520 are computationally combined via a difference to produce difference image 530. In other examples, a different type of computational combination may be used. Difference image 530 shows the difference between the filtered images. Based on the differences between edges 514a, and 514b in image 510 and edges 524a, 524b, 524c in image 520, difference image 530 can be composited with either or both of the low-light image and the thermal image to highlight the differences in either or both of those images and thereby form selectively colorized images. Further, in some examples, the difference image itself may represent the selectively colorized image, separate from the low-light and thermal images.

Figure 6:
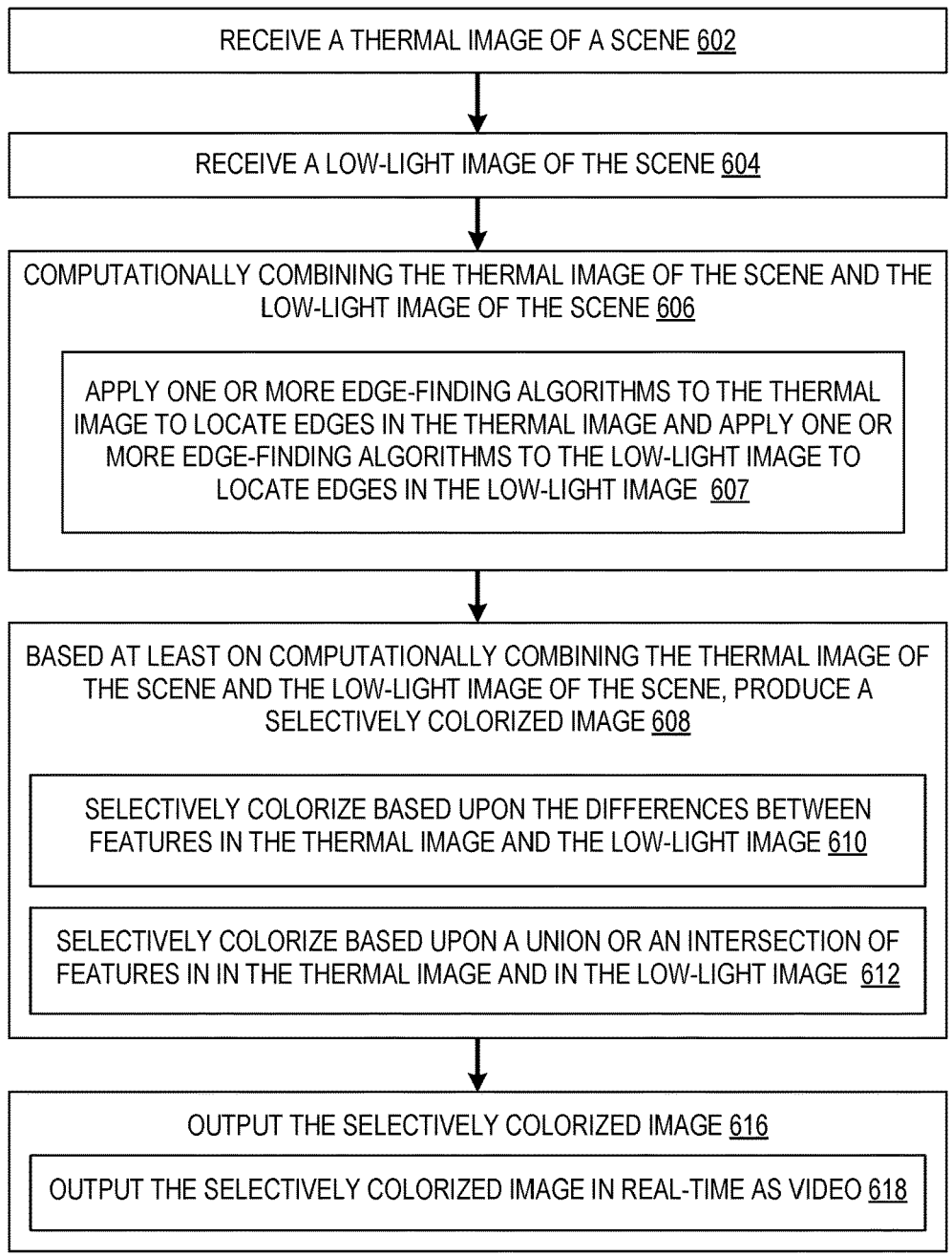
FIG. 6 shows a flow diagram depicting an example method for detecting edges in thermal images and low-light images and selectively colorizing the images.

FIG. 6 shows a flow diagram illustrating an example method 600 for selectively colorizing images based on differences between the edges in a thermal image and the edges in a low-light image. Method 600 comprises, at 602, receiving a thermal image of a scene. At 604, method 600 comprises receiving a low-light image of the scene. At 606, the method comprises computationally combining the thermal image of the scene and the low-light image of the scene. As mentioned above, the images can be computationally combined in any suitable manner, such as by computing a difference between the images, a sum of the images, a product of the images, or other suitable computational combination. Further, the computational combination may be performed after processing one or both images. As a more specific example, at 607, the images can be computationally combined by applying one or more edge-finding algorithms to the thermal image to locate edges in the thermal image and apply one or more edge-finding algorithms to the low-light image to locate edges in the low-light image. After processing the images, the images may be computationally combined (e.g. by computing a difference, a sum, a product, a quotient, a Boolean comparison, or other suitable combination).

At 608, the method comprises, based at least the computational combination of the thermal image of the scene and the low-light image of the scene, producing a selectively colorized image. In some examples, selective colorization is performed based upon differences between features in the images, as shown at 610 (e.g. differences between the images as determined at 607). In other examples, selective colorization is performed based upon a union or intersection of features in the images (e.g. a union or intersection of edges in the images as determined at 607), as indicated at 612. In some examples, different edge-finding algorithms are applied to each image (e.g. where different algorithms are better suited for each data type). In other examples, a same edge-finding algorithm may be applied to each image.

Continuing, at 616 method 600 comprises outputting the selectively colorized image. In some examples, at 618, the thermal image comprises real-time video, the low-light image comprises real-time video, and the method comprises outputting selectively colorized video frames in real-time.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
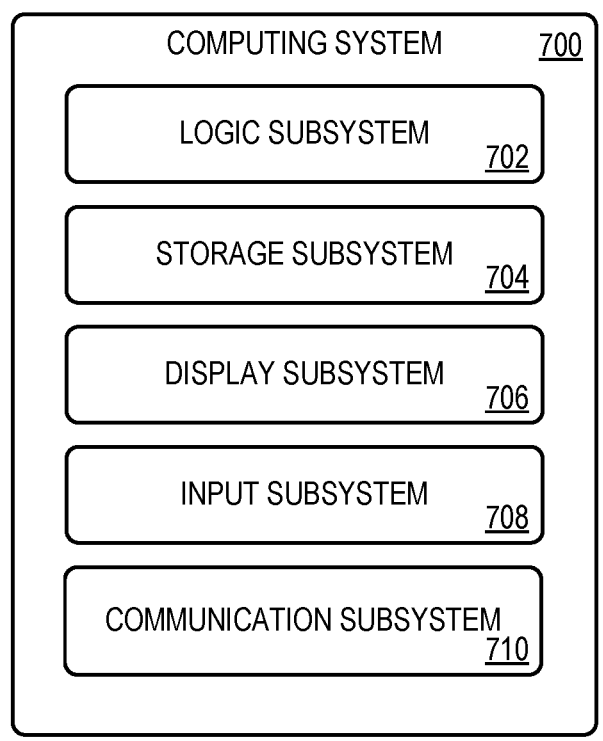
FIG. 7 shows a schematic diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing system comprising a processor and a storage device holding instructions executable by the processor to receive a thermal image acquired via a thermal imaging system, each pixel of the thermal image comprising an intensity level, generate a histogram via binning pixels by intensity level, based at least on the histogram, determine a subset of pixels to colorize, colorize the subset of pixels to produce a selectively colorized image, and output the selectively colorized image. In some such examples, the computing system may additionally or alternatively comprise instructions executable to receive a low-light image acquired via a low-light imaging system, fuse the low-light image and the selectively colorized image to produce a fused image, and output the fused image. In some such examples, the computing system may additionally or alternatively comprise instructions further executable to apply a local contrast enhancement algorithm on the thermal image to modify intensity levels of the pixels, and create the histogram via binning the pixels after modifying the intensity levels of the pixels. In some such examples, the computing system may additionally or alternatively comprise instructions executable to determine the subset of pixels to colorize based on a user-selected intensity threshold that is applied to the histogram. In some such examples, wherein the subset of pixels is a first subset of pixels, the first subset comprising pixels each having an intensity level meeting a first threshold condition, the instructions may additionally or alternatively be further executable to, based at least upon the histogram, determine a second subset of pixels to be colorized, the second subset comprising pixels each having an intensity level meeting a second threshold condition. In some such examples, the computing system may additionally or alternatively comprise instructions executable to apply a classifier function to one or more of the thermal image and the selectively colorized image to identify objects of interest. In some such examples, the instructions executable to colorize the subset of pixels may additionally or alternatively comprise instructions executable to apply a color map to the subset of pixels. In some such examples, the computing system may additionally or alternatively be configured as a head-mounted display device comprising the thermal imaging system. In some such examples, the head-mounted display device may additionally or alternatively further comprise a low-light imaging system.

Another example provides a computing system comprising a processor and a storage device holding instructions executable by the processor to receive a thermal image of a scene; receive a low-light image of the scene; computationally combine the thermal image of the scene and the low-light image of the scene; based at least on computationally combining the thermal image of the scene and the low-light image of the scene, produce a selectively colorized image; and output the selectively colorized image. In some such examples, computationally combining the thermal image of the scene and the low-light image of the scene may additionally or alternatively comprise computing a difference between the edges in the low-light image of the scene and edges in the thermal image of the scene to identify a feature based upon the difference. In some such examples, computationally combining the thermal image and the low-light image may additionally or alternatively comprise determining a union or an intersection of a feature in the thermal image and a feature in the low-light image. In some such examples, the selectively colorized image may additionally or alternatively comprise one or more of a difference image produced by comparing the edges in the thermal image and the edges in the low-light image, the difference image composited with the thermal image, and the difference image composited with the low-light image. In some such examples, the computing system may additionally or alternatively comprise a thermal imaging subsystem and a low-light imaging subsystem. In some such examples, the computing system may additionally or alternatively comprise instructions further executable to generate a histogram via binning pixels of the thermal image based on pixel intensity levels; based at least on the histogram, determine a subset of pixels of the thermal image to colorize; and produce the selectively colorized image also based on applying a threshold condition to the histogram. In some such examples, the threshold condition may additionally or alternatively be user-selected.

Another example provides a method comprising receiving a thermal image, each pixel of the thermal image comprising an intensity level; generating a histogram via binning pixels by intensity level; based at least on the histogram, determining a subset of pixels to colorize; colorizing the subset of pixels to obtain a selectively colorized image; and outputting the selectively colorized image. In some such examples, the method may additionally or alternatively comprise receiving a low-light image; fusing the low-light image and the selectively colorized image to produce a fused image; and outputting the fused image. In some such examples, the method may additionally or alternatively comprise applying a local contrast enhancement algorithm on the thermal image thereby modifying intensity levels of the pixels, and creating the histogram via binning the pixels by modified intensity level. In some such examples, determining a subset of pixels to colorize may additionally or alternatively be further based upon a user-selected intensity threshold that is applied to the histogram.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor; and
a storage device holding instructions executable by the processor to
receive a thermal image acquired via a thermal imaging system, each pixel of the thermal image comprising an intensity level;
generate a histogram via binning pixels by intensity level;
based at least on the histogram, determine a subset of pixels to colorize;
colorize the subset of pixels to produce a selectively colorized image;
receive a low-light image acquired via a low-light imaging system;
fuse the low-light image with the selectively colorized image to produce a fused image; and
output the fused image.

2. The computing system of claim 1, wherein the instructions are further executable to output the selectively colorized image together with
the fused image.

3. The computing system of claim 1, wherein the instructions are executable to apply a local contrast enhancement algorithm on the thermal image to modify intensity levels of the pixels, and create the histogram via binning the pixels after modifying the intensity levels of the pixels.

4. The computing system of claim 1, wherein the instructions are executable to determine the subset of pixels to colorize based on a user-selected intensity threshold that is applied to the histogram.

5. The computing system of claim 1, wherein the subset of pixels is a first subset of pixels, the first subset comprising pixels each having an intensity level meeting a first threshold condition, and wherein the instructions are further executable to, based at least upon the histogram, determine a second subset of pixels to be colorized, the second subset comprising pixels each having an intensity level meeting a second threshold condition.

6. The computing system of claim 1, wherein the instructions are executable to apply a classifier function to one or more of the thermal image and the selectively colorized image to identify objects of interest.

7. The computing system of claim 1, wherein the instructions executable to colorize the subset of pixels comprise instructions executable to apply a color map to the subset of pixels.

8. The computing system of claim 1, wherein the computing system is configured as a head-mounted display device comprising the thermal imaging system.

9. The computing system of claim 8, wherein the head-mounted display device further comprises the low-light imaging system.

10. A computing system comprising:
a processor; and
a storage device holding instructions executable by the processor to:
receive a thermal image of a scene;
receive a low-light image of the scene;
computationally combine intensity data for the thermal image of the scene and intensity data for the low-light image of the scene to produce a computationally combined image;
produce a selectively colorized image by selectively colorizing pixels of the computationally combined image; and
output the selectively colorized image.

11. The computing system of claim 10, wherein computationally combining intensity data for the thermal image of the scene and intensity data for the low-light image of the scene comprises computing a difference between the edges in the low-light image of the scene and edges in the thermal image of the scene to identify a feature based upon the difference.

12. The computing system of claim 10, wherein computationally combining intensity data for the thermal image and intensity data for the low-light image comprises determining a union or an intersection of a feature in the thermal image and a feature in the low-light image.

13. The computing system of claim 11, wherein the selectively colorized image comprises one or more of a difference image produced by comparing the edges in the thermal image and the edges in the low-light image, the difference image composited with the thermal image, and the difference image composited with the low-light image.

14. The computing system of claim 10, wherein the computing system comprises a thermal imaging subsystem and a low-light imaging subsystem.

15. The computing system of claim 10, wherein the instructions are further executable to:
generate a histogram via binning pixels of the thermal image based on pixel intensity levels;
based at least on the histogram, determine a subset of pixels of the thermal image to colorize; and
produce the selectively colorized image also based on applying a threshold condition to the histogram.

16. The computing system of claim 15, wherein the threshold condition is user-selected.

17. A method comprising:
receiving a thermal image, each pixel of the thermal image comprising an intensity level;
generating a histogram via binning pixels by intensity level;
based at least on the histogram, determining a subset of pixels to colorize;
colorizing the subset of pixels to obtain a selectively colorized image;
receiving a low-light image, each pixel of the low-light image comprising an intensity level;
fusing the low-light image with the selectively colorized image to produce a fused image; and
outputting the fused image.

18. The method of claim 17, further comprising outputting the selectively colorized image together with the fused image.

19. The method of claim 17, further comprising applying a local contrast enhancement algorithm on the thermal image thereby modifying intensity levels of the pixels, and creating the histogram via binning the pixels by modified intensity level.

20. The method of claim 17, wherein determining a subset of pixels to colorize is further based upon a user-selected intensity threshold that is applied to the histogram.

* * * * *